United States Patent Office 3,038,988
Patented June 12, 1962

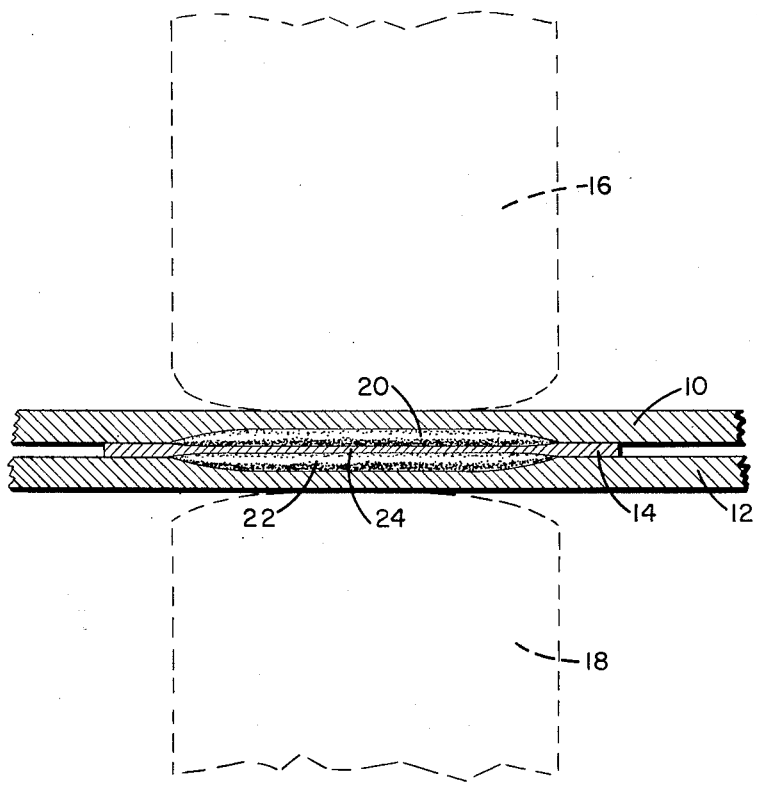

3,038,988
WELDING PROCESS
Harold D. Kessler, Steubenville, and David R. Mitchell, Wintersville, Ohio, assignors to Titanium Metals Corporation of America, New York, N.Y., a corporation of Delaware
Filed Apr. 26, 1961, Ser. No. 105,600
7 Claims. (Cl. 219—91)

This invention relates to welding titanium to ferrous metal and more particularly to resistance spot welding a titanium body to a ferrous metal body.

Resistance spot welding of metal pieces or bodies is accomplished by pressing the bodies together between welding electrodes and passing electric current between the electrodes and through the metal bodies. The contiguous surfaces of the metal bodies form an interface of relatively high electrical resistance causing fusion and coalescence of these surfaces and effective joining. In so-called series spot welding one of the metal bodies is pressed onto the other metal body by two spaced apart electrodes. The current flows from one electrode down through the overlying body, the pressed interface underneath it to the underlying metal body and then up through the pressed interface under the other electrode through the overlying body to the other electrode. Two spot welds can thus be produced simultaneously with the advantage that the welding equipment and electrodes are applied to one side only of the bodies to be welded. One of the electrodes, however, may be much larger than the other and thereby prevent the generation of sufficient heat to produce fusion and coalescence at its location, and thus produce only one weld at the location of the other electrode. Resistance spot welding is most advantageously employed when welding relatively thin bodies such as sheets or plates and is useful for welding a lining sheet onto the surface of a heavier thickness base.

Titanium has proved to be extremely difficult to weld properly to iron or iron-base metal. Fusion of these two metals at an interface results in formation of brittle iron-titanium intermetallic compounds in the weldment which destroy its ductile strength and integrity. Titanium, however, with its excellent corrosion resistance, is extremely desirable as a lining material for tanks and the like used in the chemical industry and a serious need exists for a method for welding titanium linings in the form of thin sheets to ferrous metal such as in steel tank walls and structures.

It is therefore a principal object of this invention to provide an improved method for resistance welding a titanium body to a ferrous metal body. Another object of this invention is to provide a method for resistance spot welding a titanium body to a ferrous metal body to produce a strong, ductile weldment therebetween. These and other objects of this invention will be apparent from the following description thereof.

This invention in its broad aspects contemplates a method for resistance spot welding a titanium body to a ferrous metal body in which an interlayer section of sheet of metal selected from the group consisting of vanadium and molybdenum, extending over an area at least large enough to include the area to be spot welded, is interposed between the titanium and ferrous metal body. The titanium body and interlayer sheet section of vanadium or molybdenum are then pressed against the ferrous metal body with a resistance welding electrode. In the case where a pair of spaced apart electrodes are used, one on each side of the composite of titanium, interlayer sheet section and ferrous meal, this is accomplished by urging these electrodes forcibly towards each other, thus squeezing the composite between them. If a series spot welder is employed, a pair of spaced apart electrodes on th same surface of the composite are used to press the titanium body and interlayer sheet section against the ferrous metal body which is suitably firmly supported or backed up underneath. Electric current is then passed between the electrodes to fuse together and thus form welds between contiguous surfaces of the titanium body and the section of vanadium or molybdenum and contiguous surfaces of the section of vanadium or molybdenum sheet and the ferrous metal body. The electrode pressures, current employed and time of welding are regulated so that an unmelted or solid core is preserved in the vanadium or molybdenum sheet section, this core never being molten at any time during the welding operation and therefore not fusing or taking part in the weld formation.

The term "titanium" as used herein is intended to include commercially pure titanium metal as well as various alloys of which titanium constitutes the predominant portion or is the base. Such alloys may contain, for example, aluminum, vanadium, tin, molybdenum, manganese or other elements in various proportions and combinations which impart improved mechanical properties as well as elements such as platinum and palladium which in small proportions enhance corrosion resistance. The term "ferrous metal" is intended to include iron and steel as well as stainless steel and other alloys of which iron is the predominant portion or the base. Vanadium and molybdenum will most generally be used in pure or commercially pure form.

A weld produced according to the method of this invention is illustrated in section, very much enlarged, in the single FIGURE of the annexed drawing. A sheet of titanium 10 is welded to a heavier plate of carbon steel 12. Interposed between the titanium sheet 10 and the steel plate 12 is a section of for example vanadium sheet 14. Pressure has been applied between an upper electrode shown in dotted lines at 16 and a lower electrode shown in dotted lines at 18. Electric current has been passed between electrode 16 and electrode 18 through the titanium sheet 10, the section of vanadium sheet 14 and the steel plate 12. As a result of the heat generated at the interfaces between the titanium and vanadium and the vanadium and the steel, the contiguous surfaces of the section of vanadium sheet 14 and titanium sheet 10 have been fused to form a weld 20 and the contiguous surfaces of the vanadium sheet 14 and the steel plate 12 have likewise been fused to form weld 22. During welding the electrode pressure, the strength of the welding current and the welding time have been regulated so that an unmelted or solid core 24 is preserved through the central portion of the section of vanadium sheet 14. Thus, it will be seen that the weld 20 may contain a solid solution of titanium and vanadium and the weld 22 may contain a solution of iron and vanadium and intermetallic compounds of iron and vanadium but due to preservation of the solid core 24 in vanadium sheet section 14, no portion of the weld will contain intermetallic compounds of iron and titanium which are well known to be brittle. Thus, the conjoint action of production of welds 20 and 22 is to provide a welded joint between titanium sheet 10 and steel plate 12 which is strong and ductile.

The dimensions of the titanium and ferrous metal bodies to be welded by the method of this invention may vary widely. Generally, however, they may be in the form of sheet, plate or other flat type products and not often over 0.25 inch thick for most effective spot welding. In the case of series spot welding a relatively thin, that is, less than 0.25 inch thick, titanium sheet may be readily welded to a substantially heavier steel or ferrous metal plate or other structure.

The interlayer sheet section of vanadium or molybdenum should be of size or area so as to extend at least to include the area of the weld, that is, it should be at least as large as the area between or underneath the electrodes. In the case of series spot welds a section of sheet of size suitably larger than the electrode cross section area can be placed under each electrode, or if the electrodes are closely spaced a single section of area adequate underlay both electrodes may be employed. Excess vanadium or molybdenum sheet area will do no harm but will increase the cost of processing since these are both relatively expensive metals, vanadium being more expensive than molybdenum. The section of vanadium or molybdenum sheet should be thin; generally speaking, as thin as will be required to produce the required fusion of its opposite surfaces to the titanium and ferrous metal surfaces and at the same time to preserve the essential solid core between the interfaces. The section of the vanadium or molybdenum sheet should be between 0.001 inch and 0.05 inch thick and thinner than either the titanium or ferrous metal body. Vanadium sheet as thin as 0.001 inch has successfully been used when welding 0.025 inch thick titanium sheet to 0.05 inch thick steel sheet. For welding bodies of greater thickness, that is, of the order of 0.1 to 0.25 inch thickness, a section of vanadium or molybdenum sheet of thickness from 0.005 to 0.05 inch has been found satisfactory. Excess thickness in the vanadium of molybdenum sheet is to be avoided because of its cost; very thin sheet must be very carefully employed to avoid complete fusion during welding.

The electrode pressing force may vary, preferably between 100 pounds to 2,000 pounds. In general, pressing forces are lower than normally used for resistance spot welding in order to increase the interface resistance and thereby produce the required fusion at the metal interfaces.

The welding current and time are to an extent interdependent; higher currents requiring less time and lower currents requiring longer time. It will be apparent that the current and time determine the total heat input and if too low a heat is generated, fusion and proper welding will not be accomplished. If the heat is too high, complete fusion of the vanadium or molybdenum may occur with loss of its solid core, resulting in a melt in which both iron and titanium will be present with the probability of iron titanium compound formation and a brittle weld.

The following examples illustrate the practice of the method of this invention.

EXAMPLE 1

A piece of commercially pure titanium sheet of thickness 0.062 inch was laid on a piece of type 302 stainless steel sheet 0.073 inch thick. Interposed between the titanium and steel sheets was a section about 1 inch by 1 inch of commercially pure vanadium sheet 0.020 inch thickness.

The composite of the titanium, vanadium and steel sheets was placed in a conventional 100 kva. 60 cycle per second press type spot welder equipped with RWMA Class 3, 5/8 inch diameter electrodes having 3 inch spherical tip radii. Current was measured at the primary of the transformer and multiplied by the turns ratio to obtain the secondary or actual welding current. Electrode force was measured by a standard compression type force gage with no compensation for reactive kick.

The sheet composite was placed between the electrodes with the section of vanadium sheet directly in line with the electrodes. The electrodes were pressed toward each other with a force of 675 pounds, thus squeezing the sheet composite between them, while a current of 8,000 amperes was passed for a period of 30 cycles. The welded sheets were held between the electrodes for an additional 60 cycle time period and the electrodes were then released.

The resulting weldment was examined and found to be strong and ductile. Tested in shear it showed a tensile-shear strength of 2,200 pounds which would be considered very good for the materials and thicknesses joined. Another weldment made using the same materials and similar conditions was sectioned vertically through the weld and examined under a microscope. The unmelted, solid core of vanadium was clearly seen with only a limited amount of vanadium metal at each surface fusing with the titanium and the steel to form the separated welds.

EXAMPLE 2

A piece of commercially pure titanium sheet of thickness 0.062 inch was laid on a piece of low carbon steel SAE 1010, 0.255 inch thick. Interposed between the titanium and steel sheets were two sections about 3/4 inch by 3/4 inch each of commercially pure vanadium sheet of 0.010 inch thickness. The sections of vanadium sheet were spaced apart 2½ inches center to center to correspond with the electrode spacing.

The compsoite of the titanium, vanadium and steel sheets was placed in a multigun type series welder rated at 70 kva., operating on 440 volts at 60 cycles per second. The welder was equipped with a pair of RWMA Class 3 electrodes having 3 inch radius faces. Current was measured at the transformer primary and multiplied by the turns ratio to obtain the secondary or actual welding currents. Electrode force was calibrated from the input air pressure operating the electrode mechanism.

The sheet composite was placed underneath the electrodes with the titanium sheet next to the electrodes and the steel sheet solidly supported underneath. The steel sheet was electrically insulated from its support. The sheet composite was so placed that the sections of vanadium sheet were each aligned underneath an electrode. The electrodes were forced onto the sheet composite with a force of 375 pounds, thus pressing the titanium and vanadium sheet section against the steel sheet, while a welding current of 10,300 amperes was applied for a time of 15 cycles. The welded sheets were held for an additional 60 cycle time period and the electrodes were then released.

The resulting weldment was examined and found to be strong and ductile. Tested in shear it showed a tensile shear strength of 3,080 pounds for one spot which was considered excellent for the diameter of spot weld obtained. Another weldment made using the same materials and similar conditions was sectioned vertically through the weld and examined under a microscope. The unmelted, solid core of vanadium was clearly seen with only a limited amount of vanadium metal at each surface fusing with the titanium and steel to form the separated welds.

Ductility of weldments made according to this invention is conveniently measured by determination of hardness; it is known that a Knoop hardness (100 gram load) of less than about 500 will indicate good ductility while in the range from 500 to 1000 Knoop hardness, the ductility will be lower but acceptable for many purposes; and appreciably above 1000 Knoop hardness the material will probably be brittle. A weldment, typical of those made by the process of Examples 1 and 2, was sectioned and a microhardness traverse was made completely across the titanium, vanadium, intermediate welds and the steel. The results are shown in Table 1 below. It will be seen that the Knoop hardness of both welds is reasonably low, below a maximum of about 400 for the iron-vanadium weld and the whole weldment was therefore ductile.

Table 1

[Knoop microhardness traverse of a titanium to steel weldment using an intermediate layer of vanadium. Hardness (impressions made with 100 g. load)]

| Phase | Knoop Hardness |
|---|---|
| Titanium | 304–316 |
| Titanium-Vanadium Weld | 255–272 |
| Vanadium | 164–198 |
| Carbon Steel-Vanadium Weld | 246–390 |
| Carbon Steel | 162–202 |

The following example illustrates the practice of this invention employing molybdenum as an interlayer sheet material.

EXAMPLE 3

A piece of commercially pure titanium sheet of thickness 0.062 inch was laid on a piece of type 302 stainless steel sheet 0.073 inch thick. Interposed between the titanium and steel sheets was a section about 1 inch by 1 inch of commercially pure molybdenum sheet of 0.010 inch thickness.

The composite of the titanium, molybdenum and steel sheets was placed in a conventional 100 k.v.a. 60 cycle per second press type spot welder equipped with RWMA Class 3, ⅝ inch diameter electrodes having 3 inch spherical tip radii. Current was measured at the primary of the transformer and multiplied by the turns ratio to obtain the secondary or actual welding current. Electrode force was measured by a standard compression type force gage with no compensation for reactive kick.

The sheet composite was placed between the electrodes with the section of molybdenum sheet directly in line with the electrodes. The electrodes were pressed toward each other squeezing the sheet composite with a force of 1500 pounds while a current of 16,500 amperes was passed for a period of 28 cycles. The welded sheets were held between the electrodes for an additional 60 cycles time period and the electrodes were then released.

The resulting weldment was examined and found to be strong and sound. Tested in shear it showed a tensile-shear strength of 2400 pounds which would be considered very good for the thicknesses of materials joined. Another weldment made using the same materials and similar conditions was sectioned vertically through the weld and examined under a microscope. The unmelted solid core of molybdenum was clearly seen with only a limited amount of molybdenum metal at each surface fusing with the titanium and the steel to form the separated welds. Knoop microhardness measurements were made of the various phases present in the vertically sectioned specimen. All of the phases were relatively soft except for a narrow molybdenum-stainless steel diffusion zone. Typical hardnesses were:

| | |
|---|---|
| Titanium | 227–237 |
| Titanium-molybdenum weld | 230–205 |
| Molybdenum | 238–241 |
| Stainless steel-molybdenum weld | 314–1051 |
| Stainless steel | 180–182 |

The high hardness of the stainless steel-molybdenum weld zone indicates that it would be less ductile than the titanium-to-molybdenum interface.

The weldment of Example 3, while suitable and acceptable for certain purposes, would be generally less desirable where best ductility is required, than those of Examples 1 and 2 employing vanadium as the intermediate material. The cost of molybdenum however, is substantially lower than that of vanadium so that in applications where cost is a predominant factor, employment of molybdenum may be preferred. In addition, molybdenum has a higher melting point than vanadium and higher heat inputs may be employed using a molybdenum interlayer sheet section without danger of its complete fusion and resulting weld embrittlement.

The essential feature of this invention is the production of weldments which preserve throughout the welding operation an unmelted or solid core of vanadium or molybdenum to the titanium and to the ferrous metal. The welding heat must be regulated so that sufficient vanadium or molybdenum is fused to form proper bonds with the other two metals but not so much that it becomes fused or melted across its complete thickness. Considering the number of operating variables which include, the thickness of the titanium, the vanadium or molybdenum and, except in the case of series spot welding, the ferrous metal bodies; the electrode pressing force; the size and type of electrodes; the electrode spacing; the welding current; and the welding time, it is difficult to prescribe precise and definite conditions for each specific case. Strong and ductile welds may be obtained according to this invention over relatively wide ranges of conditions providing the unmelted core of vanadium or molybdenum is preserved. In general, some broad limits can be set based on variances of the heat input which can be roughly measured as empirical units by multiplying the welding current squared by the welding time in cycles (based on 60 cycles per second). Thus, the heat input in Example 1 would amount to 1,920 million heat units. For Example 3 it would be 7,623 million heat units. Obviously shorter time periods at higher amperage can provide the same heat input as longer time at lower amperage. On this basis satisfactory welds can be made according to this invention employing from 500 million to 10,000 million heat units and employing vanadium or molybdenum and the thicker vanadium sheet within these ranges. The electrode pressing force may vary preferably from 100 pounds up to about 2,000 pounds. When the lighter pressing forces within this range are employed the interface resistance will tend to be higher with generation of more actual heat in such areas. Therefore the higher heat input values and lighter electrode pressures should be used when using thicker vanadium or molybdenum sheet sections, since this combination of force and current will tend to supply excess welding heat with resulting complete fusion of a thin interlayer sheet section if this is used. Other factors, including electrode diameter and spacing, and titanium and ferrous metal body thickness, will also need to be considered as will be apparent to those skilled in the art and their effects applied to modify the conditions stated above within their defined ranges to obtain the desired weld characteristics.

The method of this invention is useful for producing strong and ductile welds between a titanium and a ferrous metal body. The shear-tensile test as well as micro-hardness tests indicate that welds can be produced that are strong and ductile. The method finds application in welding titanium sheet to steel sheet or plate to produce a composite structure possessing an excellent corrosion resistant surface imparted by the titanium. Such composite structures are particularly useful in the chemical industry with titanium lined steel tanks and other equipment providing long life and excellent resistance to corrosive solutions.

We claim:

1. A method for resistance spot welding a titanium body to a ferrous metal body which comprises; interposing an interlayer sheet section of metal selected from the group consisting of vanadium and molybdenum, between said titanium body and said ferrous metal body, said interlayer sheet section extending over an area at least large enough to include the area to be spot welded, pressing said titanium body and said interlayer sheet section against said ferrous metal body by means of a resistance welding electrode, and passing electric current between said electrode and said ferrous metal body through said titanium body and said interlayer sheet section in amount to fuse together contiguous surfaces of said titanium body and said interlayer sheet section, and contiguous surfaces of said interlayer sheet section and said ferrous metal body, while preserving an unmelted core in said interlayer sheet section.

2. A method for resistance spot welding a titanium body to a ferrous metal body which comprises; interposing an interlayer sheet section of vanadium metal between said titanium body and said ferrous metal body, said interlayer sheet section extending over an area at least large enough to include the area to be spot welded, pressing said titanium body and said interlayer sheet section against said ferrous metal body by means of a resistance welding electrode, and passing electric current between said electrode and said ferrous metal body through said titanium body and said interlayer sheet section in amount to fuse together contiguous surfaces of said titanium body and said interlayer sheet section, and contiguous surfaces of said interlayer sheet section and said ferrous metal body, while preserving an unmelted core in said interlayer sheet section.

3. A method for resistance spot welding a titanium body to a ferrous metal body which comprises; interposing an interlayer sheet section of molybdenum metal between said titanium body and said ferrous metal body, said interlayer sheet section extending over an area at least large enough to include the area to be spot welded, pressing said titanium body and said interlayer sheet section against said ferrous metal body by means of a resistance welding electrode, and passing electric current between said electrode and said ferrous metal body through said titanium body and said interlayer sheet section in amount to fuse together contiguous surfaces of said titanium body and said interlayer sheet section, and contiguous surfaces of said interlayer sheet section and said ferrous metal body, while preserving an unmelted core in said interlayer sheet section.

4. A method for resistance spot welding a titanium body to a ferrous metal body which comprises; interposing an interlayer sheet section of metal selected from the group consisting of vanadium and molybdenum, between said titanium body and said ferrous metal body, said interlayer sheet section extending over an area at least large enough to include the area to be spot welded, pressing said titanium body and said interlayer sheet section against said ferrous metal body by means of a pair of spaced apart resistance welding electrodes, and passing electric current between said electrodes and thereby through said titanium metal body, said interlayer sheet section and said ferrous metal body in amount to fuse together contiguous surfaces of said titanium body and said interlayer sheet section, and contiguous surfaces of said interlayer sheet section and said ferrous metal body, while preserving an unmelted core in said interlayer sheet section.

5. A method for resistance spot welding a titanium body to a ferrous metal body which comprises; interposing an interlayer sheet section of metal selected from the group consisting of vanadium and molybdenum, between said titanium body and said ferrous metal body, said interlayer sheet section extending over an area at least large enough to include the area to be spot welded, pressing said titanium body and said interlayer sheet section against said ferrous metal body by squeezing between a pair of resistance welding electrodes, and passing electric current between said electrodes and thereby through said titanium metal body, said interlayer sheet section and said ferrous metal body in amount to fuse together contiguous surfaces of said titanium body and said interlayer sheet section, and contiguous surfaces of said interlayer sheet section and said ferrous metal body, while preserving an unmelted core in said interlayer sheet section.

6. A process according to claim 1 in which the force employed in pressing the titanium body and interlayer sheet section against the ferrous metal body is between 100 pounds and 2,000 pounds and the heat input calculated by multiplying the square of the current passed by the welding time in cycles based on 60 cycles per second is between 500 million and 10,000 million units.

7. A process according to claim 1 in which the thickness of the interlayer sheet section is between 0.001 inch and 0.05 inch, and the force employed in pressing the titanium body and interlayer sheet section against the ferrous metal body is between 100 pounds and 2,000 pounds and the heat input calculated by multiplying the square of the current passed by the welding time in cycles based on 60 cycles per second is between 500 million and 10,000 million units, with the lighter pressing forces and higher heat input units employed in combination with the thicker interlayer sheet sections, and vice versa, within the ranges stated.

References Cited in the file of this patent

UNITED STATES PATENTS 2,005,256     Eitel et al.             June 18, 1935